United States Patent [19]

Garcia-Mallol et al.

[11] Patent Number: 4,597,774
[45] Date of Patent: Jul. 1, 1986

[54] METHOD FOR IMPROVING THE OPERATION OF A FLUIDIZED BED

[75] Inventors: Juan A. Garcia-Mallol, Morristown, N.J.; Brian T. Sinn, Williamsport, Pa.

[73] Assignee: Foster Wheeler Energy Corporation, Livingston, N.J.

[21] Appl. No.: 663,533

[22] Filed: Oct. 22, 1984

[51] Int. Cl.$^4$ ............................................. F27B 15/08
[52] U.S. Cl. ..................................... 48/197 R; 34/10; 34/57 A; 48/210; 208/161; 208/250; 422/145; 431/7
[58] Field of Search ................................. 422/144–147, 422/139; 55/73–77; 48/197 FM, 210, 197 R; 34/57 A, 218; 208/208 R, 250, 161; 431/7; 423/244; 34/10

[56] References Cited

U.S. PATENT DOCUMENTS

| | | | |
|---|---|---|---|
| 2,662,091 | 12/1953 | Odell | 422/145 X |
| 2,728,632 | 12/1955 | Matheson | 208/161 X |
| 3,066,017 | 11/1962 | Jahnig | 422/145 |
| 3,309,262 | 3/1967 | Copeland et al. | 422/145 X |
| 3,389,076 | 6/1968 | Oldweiler | 422/145 X |
| 4,311,670 | 1/1982 | Nieminen et al. | 422/145 |
| 4,321,233 | 3/1982 | Tsuji et al. | 422/145 X |
| 4,333,909 | 6/1982 | Stewart et al. | 422/145 X |
| 4,359,005 | 11/1982 | Baston | 422/145 X |

Primary Examiner—Richard L. Chiesa
Attorney, Agent, or Firm—Marvin A. Naigur; John E. Wilson; Warren B. Kice

[57] ABSTRACT

A method of operating a fluidized bed in which a bed of particulate combustible material is disposed on a perforated plate and air is introduced through the plate and into the bed to fluidize and promote the combustion of the material. Additional particulate material, of a size less than that of said combustible particulate material, is introduced to the bed so that it is entrained in the air to maintain the combustible material in the bed.

9 Claims, 2 Drawing Figures

METHOD FOR IMPROVING THE OPERATION OF A FLUIDIZED BED

BACKGROUND OF THE INVENTION

This invention relates to a method of operating a fluidized bed reactor and, more particularly, to a method for improving the reaction efficiency of same.

The use of fluidized bed reactors, in the form of combustors, gasifiers or steam generators has been recognized as an attractive means of generating heat. In the operation of these reactors air is passed through a bed of particulate material which includes a mixture of inert material, a fuel material such as high sulfur, bituminous coal and, usually, adsorbent material for the sulfur oxides formed as a result of the combustion of the coal. As a result of the air passing through the bed the bed is fluidized which promotes the combustion of the fuel. The basic advantages of such an arrangement are many and include a relatively high heat transfer rate, a substantially uniform bed temperature, combustion at relatively low temperatures, ease of handling the fuel materials, a reduction in corrosion and boiler fouling and a reduction in boiler size.

However, in these types of methods the quantity and velocity of the air supplied to the bed must be sufficient to maintain same in a fluidized condition and, as a result, a portion of the particulate bed material is entrained by the air passing through the bed and includes unreacted fuel and adsorbent material. In some methods, the air passing through the bed along with the gaseous products of combustion and the particulate material entrained therein is passed to a dust collector, or the like, for separating the solids from the gases, and the solids are then discarded or passed to an external apparatus not connected with the fluidized bed process. Since a good percentage of the particulate material thus discarded contains unreacted solids, this lowers the potential reaction efficiency of the process.

In other methods of this type, the separated solids are injected back into the bed so that the unreacted fuel will hopefully combust along with the other particulate fuel in the bed. However, fuel material is still carried out of the bed in an unreacted state, which results in a less than optimal fuel burning and renders the system sensitive to fuel sizing and ash content.

SUMMARY OF THE PRESENT INVENTION

It is therefore an object of the present invention to provide a method for generating heat utilizing a fluidized bed in which the reaction efficiency of the bed is increased.

It is a further object of the present invention to provide a method of the above type in which the solid particulate fuel material and sulfur adsorbent material is retained in the fluidized bed and is prevented from being entrained by the air passing through the bed.

It is a still further object of the present invention to provide a method of the above type in which auxiliary circulating solids are introduced into the fluidized bed to confine the particulate fuel material and sulfur adsorbent material to the bed by outpacing and crowding out same by saturating the upflowing gas column.

It is a still further object of the present invention to provide a system and method of the above type in which the auxiliary circulating solids are small enough to be entrained by the air in lieu of the particulate fuel material and sulfur adsorbent material yet large enough to be captured in a dust separator or the like for recycling back into the bed.

Toward the fulfillment of these and other objects a bed of particulate combustible material is disposed on a perforated plate and air is introduced through the plate and into the bed to fluidize and promote the combustion of the material. Additional pariculate material of a size less than that of said combustible particulate material and sulfur adsorbent material is introduced to the bed so that the additional particulate material is entrained in the gas and the combustible material is maintained in the bed.

BRIEF DESCRIPTION OF THE DRAWINGS

The above brief description, as well as further objects, features and advantages of the present invention will be more fully appreciated by reference to the following description of the presently preferred but nonetheless illustrative embodiment in accordance with the present invention, when taken in connection with the accompanying drawing in which.

DESCRIPTION OF THE PREFERRED EMBODIMENTS

Figure 1:
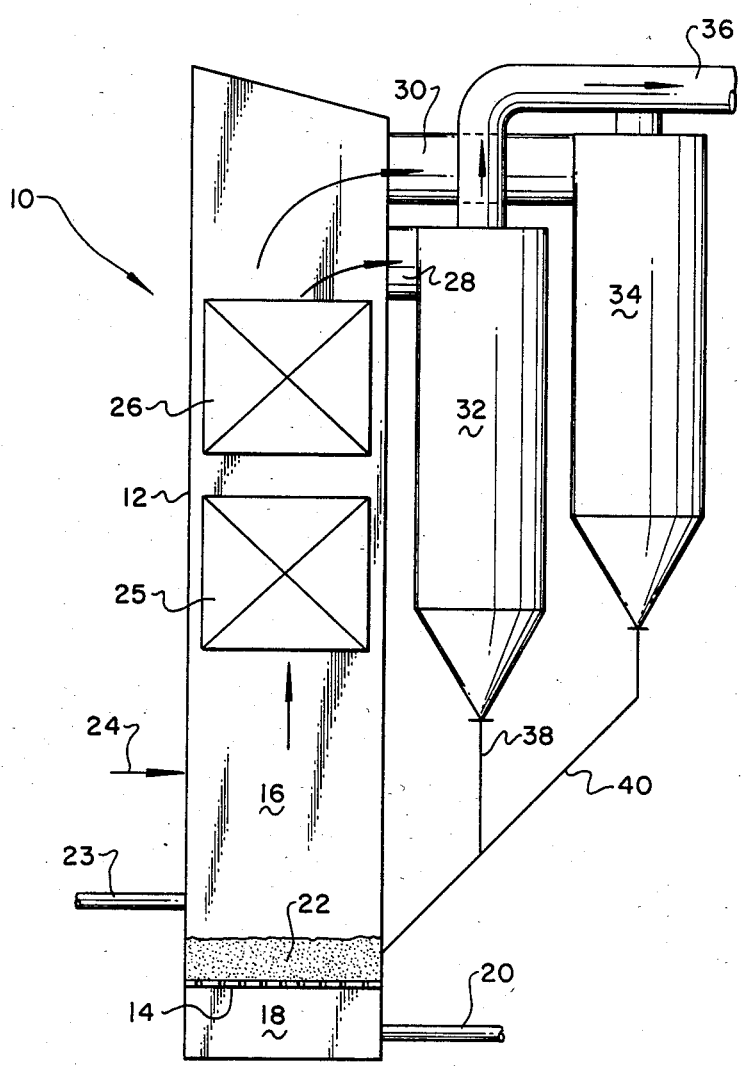
FIG. 1 is a schematic diagram of a reactor which is operated according to the method of the present invention.

Referring specifically to the drawing, the reference numeral 10 refers in general to a fluidized bed combustor/reactor which includes a housing 12 having an air distribution plate 14 disposed therein which divides the housing into an upper chamber 16, or freeboard, and a lower chamber 18. Air is introduced into the lower chamber 18 through an inlet 20 for passage upwardly through the plate 14 and into the upper chamber 16. A bed of particulate material, shown in general by the reference numeral 22, is disposed on the plate 14 and includes a mixture of crushed coal, fine limestone or dolomite for use as an adsorbent for the sulfur oxides formed during the combustion of the fuel, and an auxiliary particulate solid material for purposes that will be described in detail later.

Additional coal and limestone from an external source (not shown) is introduced into the bed 22 through an inlet 23 communicating with the upper chamber 16, it being understood that, alternately, the particulate fuel material can be provided to the bed by spreader feeders, or the like, while the adsorbent material can be dropped on the bed from a number of locations along the width of the enclosure.

The air passing upwardly through the bed 22 in the housing 12 mixes with the gaseous products of combustion (with the resulting mixture hereinafter being referred to as gases) and with additional air normally provided through an inlet 24 located above the height at which coarser solids projected by the bed are disengaged before passing over a pair of heat exchangers 25 and 26 and exiting through a pair of outlets 28 and 30 formed in the upper portion of the housing. Typically for bituminous coal firing, 50% of the theoretical air for combustion would enter through inlet 20 and 70% through inlet 24. The heat exchanger 25 and 26 each consist of panels of heat exchange tubes disposed in a serpentine relationship for circulating fluid, such as water, between an inlet an an outlet (not shown) to transfer heat from the gases to the fluid. Since this is a conventional design it will not be described in any further detail.

In passing through the upper chamber 16 the gases entrain a portion of the particulate material in the bed 22 which, under normal circumstances, would be reacted and unreacted fuel and adsorbent material.

Figure 2:
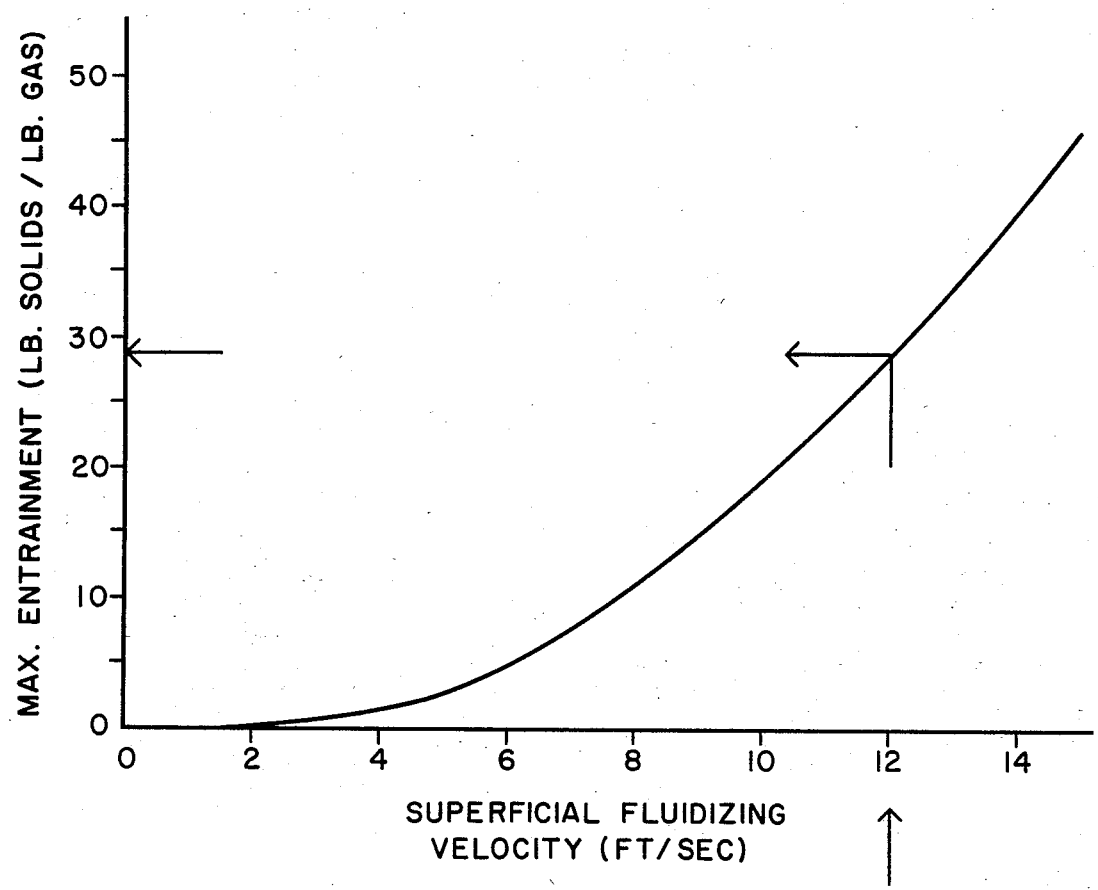
FIG. 2 is a graph depicting the relationship between the two parameters in the method of the present invention.

However, according to the present invention the bed 22 is provided with an auxiliary solids particulate material which is sized to be smaller than that of the particulate fuel and adsorbent but large enough to be collected in a cyclone, or other type of separator, as will be described. The auxilliary particulate solid material may be in the form of nodules, or small rounded lumps of a mineral or mineral aggregate, which are sized to be less than that of the size of the particulate fuel and adsorbent material. The nodules are sized and their quantity is selected so that they outpace and crowdout the particulate fuel and adsorbent in the bed by saturating the upflowing gases from the bed 22. For example, the nodules could have an average 125 um particle size or less when its particle density is 150 lb/ft$^3$. As a result, the particulate fuel and adsorbent remain in the bed 22 and the nodules are entrained in the gases passing from the bed, through the upper portion of the upper chamber 16, across the heat exchangers 25 and 26 and through the outlets 28 and 30. From the latter outlets, the gases and entrained nodules pass into a pair of cyclone separators 32 and 34, respectively, located adjacent the housing 12. The separators 32 and 34 can be in the form of low velocity dust collectors, or any other conventional design, and function to separate the nodules from the gases with the latter exiting from the separators into a conduit 36 for passage to additional heat exchangers (not shown). The nodules discharge from the lower portions of the separators 32 and 34 and pass, via lines 38 and 40, back to the fluidized bed 22. For bituminous coal, the solids-to-gas weight ratio within the lower portion of the enclosure 12 can be maintained at approximately thirty to one at a twelve foot per second superficial velocity. After the addition of air through the inlet 24, the velocity approaches thirty feet per second with a solids-to-gas weight ratio near twelve to one. The relationship between the superficial velocity and the solids-to-gas weight ratio is depicted in the graph of FIG. 2, at the condition specified.

Several advantages evolve from the foregoing. For example, the auxiliary particulate nodules are of a size smaller than most of the particulate fuel and adsorbent products and are thus entrained in the gases passing through the upper chamber 16 to the exclusion of the fuel and adsorbent particles which remain in the bed 22 where they work more effectively. This eliminates most entrainment of the unreacted fuel and adsorbent material in the gases and the resulting discharge of same from the bed, thus improving the fuel burning and the efficiency of the bed, and minimizing the sensitivity of the design to fuel sizing and ash content. Also, the emission of carbon monoxide is minimized since the fuel particles producing carbon monoxide remain in the bed, giving the carbon monoxide gas time to react with oxygen molecules from the air and burn to carbon dioxide.

Further, an optimum heat balance can be maintained in the bed since the circulating nodules accomplish the heat balance of the bed as they are returned at a lower temperature than the bed. Also, the particulate nodules do not have to be replenished. Other materials, particularly the sulfur absorbent products form a bubbling fluidized bed that provides good lateral mixing and prevents the segregation of the coarser fuel and adsorbing materials throughout the operating range.

The auxilliary circulating solids loading in the area of the heat exchangers 25 and 26 enhance the heat transfer, which will take place at a rate similar to the average absorption rate in the furnace of a conventional pulverized coal fired boiler.

The bed can be fluidized with just enough air or other oxidizing agent to gasify the burnable fraction of the fuel material or, if complete combustion is required, additional air or oxidizing agent can be admitted through the ports 24 as necessary. Low nitrogen oxides emissions result from this to staged combustion.

Operation at partial loads if required can be accomplished while maintaining the fluidized bed temperature within a narrow range by reducing fuel and air feed and by changing the proportion of air, port 20, to the bed and 24 to the chamber, thus changing bed heat release.

In the event the reactor of the present invention is used as a steam generator, the enclosure 12 may be formed by membrane walls formed of a plurality of spaced, parallel heat exchange tubes connected together by continuous fins to render the enclosure airtight and to provide for passage of the water either sequentially or simultaneously through the walls. Also, a conventional natural circulation system can be used in connection in a similar manner.

It is noted that the type of auxiliary circulating solids can vary and can be selected so that their physical and chemical characteristics best suit the particular process. By changing the type of auxiliary particulate nodules, the design of the bed can be adapted to fuels of widely different characteristics without changing the hardware.

It is also understood that the reactor shown can be a modular portion of a plurality of interconnecting cells to form a much larger boiler as needed especially in the event the reactor is used as a large capacity steam generator.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A method of operating a fluidized bed combustion reactor comprising the steps of disposing on a perforated plate a bed of particulate material including a sulfur adsorbent material and a combustible material, introducing air through said plate and into said bed to fluidize and promote the combustion of said materials, and providing an exit for combustion gases which would normally entrain a portion of said materials as said gases pass through said bed; wherein the improvement comprises the step of introducing additional particulate material to said bed, said additional particulate material being of a different composition than said sulfur adsorbent material and said combustible material and being of a particulate size less than the particulate size of said sulfur adsorbent material and combustible material so that said additional particulate material is neither sulfur adsorbent or combustible and is entrained in said gases while said sulfur adsorbent material and combustible material ar maintained in said bed.

2. The improvement of claim 1 wherein the size of said additional particulate material is large enough to be collected in a cyclone.

3. The improvement of claim 1 wherein said additional particulate material is in the form of a mineral or a mineral aggregate.

4. The improvement of claim 1 further comprising the step of separating the entrained additional particulate material from said gases externally of said bed and reintroducing said additional particulate material to said bed.

5. The improvement of claim 1 further comprising the step of adding more particulate combustible material to said bed which is of a size greater than that of said additional particulate material.

6. The improvement of claim 1 further comprising the step of adding more particulate adsorbent material to said bed which is of a size greater than that of said additional particulate material.

7. The improvement of claim 1 wherein the amount of air introduced into said bed is controlled so that it is sufficient to gasify said combustible material but insufficient to completely burn said combustible material.

8. The improvement of claim 1 wherein the ratio of particulate material to air is approximately thirty to one at a twelve feet per second superficial velocity.

9. The improvement of claim 7 wherein the average size of said additional particulate material is 125 um.

* * * * *